United States Patent

Zekowski

Patent Number: 5,844,167
Date of Patent: Dec. 1, 1998

[54] ELECTRICAL FIXTURE INSTALLATION ASSIST MEANS

[76] Inventor: Gerald I. Zekowski, 8256 E. Prairie, Skokie, Ill. 60076

[21] Appl. No.: 378,772

[22] Filed: Jan. 26, 1995

Related U.S. Application Data

[63] Continuation-in-part of Ser. No. 936,578, Aug. 27, 1992, Pat. No. 5,387,066.

[51] Int. Cl.⁶ .................................................... F16B 35/00
[52] U.S. Cl. ............................................................. 174/48
[58] Field of Search .............................. 248/343; 174/48, 174/50, 49

[56] References Cited

U.S. PATENT DOCUMENTS

| 4,988,067 | 1/1991 | Propp et al. | 248/343 |
| 5,387,066 | 2/1995 | Zekowski | 411/390 |

*Primary Examiner*—Kristine L. Kincaid
*Assistant Examiner*—Joseph Waks
*Attorney, Agent, or Firm*—Sidney N. Fox

[57] ABSTRACT

A threaded attachment rod for use in assisting the installation of an electrical fixture to a structurally mounted electrical junction box. The attachment rod has opposite threaded end portions, one end threadably engagable with the junction box and an opposite end portion. The attachment rod has a fastener engaged with the opposite end thereof and a notch formed at a predetermined location between the ends thereof. The fastener is adapted to support the fixture temporarily at a distance from the junction box sufficient to provide access sufficient to complete an electrical connection between the wires from the junction box and from the electrical device carried by the fixture. An upset portion is formed in a threaded length of the attachment rod above the notch. After completion of the connection, the fixture and the fastener both are moved above both the upset portion and the notch, the attachment rod severed leaving the remnant portion passing through the fixture opening and possibly extending unduly outward of or interior of the fixture with the fastener supporting the fixture permanently. The fastener then can be rotated further, engaging the upset portion and being jammed thereon. Further rotation of the fastener causes the remnant portion to be rotated, withdrawing the undue extension thereof.

18 Claims, 2 Drawing Sheets

ELECTRICAL FIXTURE INSTALLATION ASSIST MEANS

REFERENCE TO RELATED APPLICATIONS

This application is a continuation-in-part of applicant's application Ser. No. 07/936,578 filed Aug. 27, 1992 entitled Electrical Fixture Installation Method and Means, now U.S. Pat. No. 5,387,066 granted Feb. 7, 1995.

FIELD OF THE INVENTION

This invention is an improvement of the electrical fixture assist means disclosed in the above identified patent application, and, particularly relates to the provision of an improved attachment rod which is provided with a formation enabling modification either of the degree of extension of the remnant end thereof outward from the fixture where it is exposed unduly to view or its degree of extension inward of the fixture where it interferes with the function of said fixture subsequent to completion of the installation.

BACKGROUND OF THE INVENTION

The invention disclosed in the referenced co-pending patent application provided a method and means for assisting an installer in the installation of electrical fixtures by enabling temporary support for a mountable electrical fixture during the wiring process involved in the installation of the fixture and enabling the temporary support permanently to support the electrical fixture once the installation has been completed.

The particular type of electrical fixtures involved is suspended from the ceiling or the wall of an enclosure. In effecting the installation, the installer must electrically couple the electrical device carried by or mounted on the fixture to the electrical wires carried by an electrical junction box mounted in or at the ceiling of the enclosure or mounted on a wall thereof. The installation requires the correct electrical power lead wires extending from the electrical junction box to be properly tied to the correct electrical wires from the electrical device carried by the fixture.

Not only does the installer experience considerable danger of maintaining balance often while standing upon a ladder at a distance from ground level, but the installer must have visual as well as manipulative access to the field involved. The installer must stretch and reach above his head, in installing ceiling mounted fixtures, while maintaining such precarious position, aligning the attachment holes formed in the attachment tabs of the junction box with the spaced openings carried by the fixture (or by strip plates carrying hanger rods supporting the rest of the fixture) and guiding and feeding the attachment rods into the aligned threaded attachment holes and spaced openings. Before the fixture is positioned at its final installed disposition either flush to the ceiling or closely proximate thereto, the correct electrical power lead wires from the junction box must be connected to the correct electrical wires of the electrical device (as by tying their ends together and capping the tied ends). The fixture must be supported during the manipulations required to make the electrical connection. Where the fixtures are to be flush mounted or mounted closely proximate to the ceiling, there is minimum space available between the junction box and the fixture to permit sufficient access by the installer between the preinstalled junction box and the fixture to effect the selection of the correct electrical power lead wires and and electrical wires, the alignment of the respective openings and the manual manipulations required to accomplish the electrical connection. The fixture generally blocks the installer's view of junction box and attachment holes, as well as the wires concerned so that the manipulations, locating and guiding must be accomplished blindly with the installer often working by touch and feel. All these steps require these manipulations to be carried out at the same time that the installer also must hold onto the fixture and maintain his balance on the ladder.

The manipulations also require the installer to maintain his grip on the tools, however simple, which are necessary to effect the electrical connections. Conventionally, the assistance of another individual or individuals should be required. The necessity of having more than one workman or tradesman on the job raises the cost of the installation, and, as well, increases the time required for such installation. Effecting the installation by utilizing only one installer is a difficult procedure, is clumsy, time consuming and presents considerable risk to such professional tradesman as well as risk of liability to the employer or property owner.

The attachment rods may be pre-installed in the threaded attachment holes carried by the electrical junction box. In such installations, the fixture itself must be moved into position, the spaced openings carried thereby aligned with the attachment holes and the attachment rods guided therethrough and the fastener members engaged with the ends thereof. After the electrical connection has been made, and the fixture is to be moved closer to the junction box, the wires, which are, in such situations, of considerably greater length than those utilized in the afore mentioned situations, are bulkier often difficult to accommodate in the available space. This makes the handling of the fixture and the steps of the installation exceedingly difficult since all must be performed by the installer without losing his balance while supporting the fixture with one hand and manipulating fixture, tools, attachment rods and fastener members with the other hand. These problems are faced by the professional installer as well as the amatuer "do-it-yourselfer".

In the prior application, applicant provided installation assist means for enabling first temporary support of an electrical fixture in a position spaced from the junction box, hence from the ceiling in respect of ceiling mounted junction boxes, so that the installer can gain sufficient access to the electrical wires of the junction box and of the electrical device carried by the fixture with enough space available to enable the installer to "wire" the fixture/junction box as well as effecting the locating, guiding and fastening steps. The assist means further enables the installer to effect the electrical connection while the fixture is temporarily supported and thereafter permits the fixture to be raised to its installed position and permanently supported at that disposition.

The referenced pending prior application provided a partially threaded elongate attachment rod having manually effectable separation means preferably in the form of a knock-off notch, located at a selected location along the rod between the opposite ends thereof. The selected location is determined by the position the fixture is to be disposed permanently. One threaded end of the attachment rod is engaged with the attachment holes of the junction box and the opposite end of the attachment rod passes through a respective one of the spaced openings carried by the fixture. A fastener member is engaged with said opposite end for supporting the fixture temporarily at a distance from the junction box. The attachment rod is long enough so that said distance is sufficient to enable the installer to gain enough access between the junction box and the fixture to effect the electrical connection between electrical power lead wires emanating from the junction box and the electrical wires leading from the electrical device carried by the fixture. When the electrical connection is completed, the fixture is slidably raised along the attachment rod to a location above the knock-off notch. The fastener member also is raised to a location above said knock-off notch so that when the electrical connection is completed, and the attachment rod is severed at the knock-off notch, the fixture then is supported permanently by the fastener member in its raised installed disposition.

The attachment rods for use to assist in the installation conveniently have been formed to a standard length suitable for effective use in most frequently encountered installation situations. However, in some instances, certain types of electrical fixtures are encountered where the threaded remnant end of the standard length attachment rod would extend outward from the fixture upon completion of the installation so as to be obvious when viewed by an observer from the exterior of the installed fixture, thereby detracting from a clean finished appearance of the completed installation. Other types of electrical fixtures are constructed so that the remnant end of the standard length attachment rod would extend into the interior of the fixture to a depth which would interfere with its function, that is, with the electrical device carried by the fixture.

Among the types of fixtures where the installation thereof result in the aforementioned problems are fixtures having an open top hemispherical or another concave dish-shaped canopy installed with its top edge flush or closely proximate to the ceiling, including those having depending convex reflector with the lighting element, a lamp, installed in a socket, the wiring of which is fed through a hollow tubular member coupled to the reflector and hanging from the canopy arranged flush to the ceiling, the wires leading from the socket being connected to the wires of the pre-mounted junction box with the canopy held spaced flush with or closely proximate to the ceiling and the junction box by the installation assist means, the fastener member supporting the fixture, particularly the canopy, temporarily spaced from the junction box during the installation process. When the electrical connection has been completed, the canopy is raised with the rest of the fixture along the length of the attachment rod to a position where a threaded portion of the attachment rod above the knock-off notch extends through the spaced opening of the canopy and the fastener member also is brought to a position below the knock-off notch. This raised position is where the mouth of the canopy either is flush to the ceiling or very closely proximate the surface thereof. The attachment rod is severed at the manually effectable separation means thereof once the electrical connection has been completed, defining the threaded remnant end which now carries the fastener member. The remnant end now may extend considerably outward of the canopy and be plainly visible to a viewer, marring the finished appearance of the completed installation.

Another type of fixture which gives rise to problems in the installation thereof are those having a dish-like generally concave upwardly opening reflector which includes a hollow tubular hanger member which depends from a cross-strap secured to the junction box and passes through an opening at the center of the reflector. Here an enlarged head of the hanger member supports the reflector. The attachment rods extend into the area of the dish like reflector and interfere with the function thereof. A still other type of fixture for which the the installation assist means of the prior application are not adapted for use therewith are those having the light generating means fitted into sockets that are mounted so that the light generating means, when installed in the sockets extend across the area into which too much of the threaded remnant portion of the installation assist means would remain so as to interfere with the function of the light generating means carried by the fixture.

A still other type of electrical fixtures whose installation utilizing the assist means described in the copending application comprise those electrical fixtures which include lighting means pivotally mounted so that the extension of the remnant end outward of the canopy is such as literally to intercept the pivoting path of the lighting elements, thus interfering therewith. Some of these fixtures include lamp socket means in which lamps are engaged either to enter the area of the interior of the fixture or to extend into such area, their disposition being blocked by the over-extension of the attachment rods into the interior of the fixture or outward therefrom.

The improvement herein provided is intended to provide assistance for the installation of the above mentioned type of fixtures which are not beneficially assisted by employing the installation assist means of the prior invention having modifications remedial to the problems found in the installation of such fixtures as would fall into the type where the installation assist means of the copending application would not be beneficial for assisting in the installation thereof, primarily being those installations where the extension of the remnant end is such as to interefere with the function of the fixture, that is, the electrical device carried thereon or which mars the finished appearance of the installation of the fixture.

SUMMARY OF THE INVENTION

The herein invention provides electrical fixture assist means comprising an elongate threaded attachment rod having at least one threaded end capable of being threadably engaged in the threaded attachment holes formed in the conventional attachment tabs associated with an electrical junction box and a threaded opposite end and a fastener member adapted to be engaged with said threaded opposite end for temporarily supporting a fixture during the making of an electrical connection with the electrical leads of an electrical device carried by an electrical fixture, the attachment rod having a weakened portion at a predetermined location along the length of the attachment rod and an upset portion formed in the opposite threaded end at a location above said weakened portion and adjacent thereto, said location being between the threaded end engagable with the attachment hole and the weakened threaded portion thereof, said attachment rod being severable at the weakened portion to define a threaded remnant end and a fastening member adapted to engaged with said remnant end portion and optionally, said said upset portion being capable of seizing or jamming said fastener member whereby further rotation of said fastener member effects rotation of said remnant end portion within the attachment hole for moderating the degree of extension of the remnant end outward from the fixture subsequent to severance of the attachment rod at the weakened threaded portion, whereby to withdraw any extension of said remnant end portion which may interfere with the function of said fixture or which may extend sufficiently outward of said fixture to mar the finished appearance of said installation.

DESCRIPTION OF PREFERRED EMBODIMENTS

The electrical fixture installation assist means of the herein invention is illustrated as applied to the installation of electrical fixtures to a ceiling-mounted electrical junction box, said installation assist means enabling temporary support for the fixture during the installation and permanent support for the fixture when the installation is completed. The installation assist means of the herein invention is particularly useful in respect of installations where a portion of said assist means remains exposed to view subsequent to the installation and/or those installations where the installation assist means extends into the interior of the fixture and interferes with the function of the electrical fixture subsequent to the completion of the installation.

Among the types of fixtures with which the herein invention is advantageously utilized are those fixtures some of which include a canopy which is to be installed with the open portion thereof flush against or closely proximate to the ceiling of an enclosure. The pertinent installations are illustrated and discussed hereinafter with reference to FIGS. 4 through 6 for brief diagrammatic explanations and reference to FIGS. 7 through 9 for more description.

Figure 1:
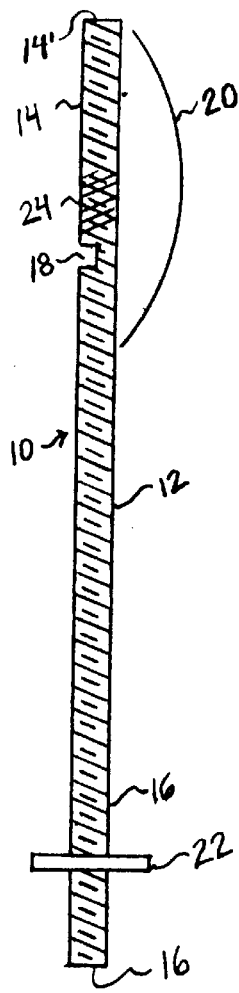
FIG. 1 is an elevational view of the improved elongate at least partially threaded attachment rod constituting the electrical fixture installation assist means according to the herein invention.

Referring to FIG. 1, the electrical fixture installation assist means according to the herein invention is designated generally by reference character 10 and comprises an elongate threaded attachment rod 12 having opposite threaded ends 14 and 16. (The elongate threaded attachment rod 12 can be partially threaded). One end 14 of rod 12 is adapted to be engaged within the threaded attachment hole 52 formed in the attachment tab 50 carried by the electrical junction box 42. The attachment holes 60 in FIGS. 6, 7, 8 and 9) also can be threaded. The opposite threaded end 16 of elongate threaded attachment rod 12 is adapted to be passed through the selected spaced mounting openings 23, formed in the mounting surface of electrical fixture 42, as shown in canopies 32 in FIGS. 4, 5, 7 and 8; the strap 40 for mounting canopy portion 32' in FIG. 6; and the fixture 74 represented in FIG. 9. Manually effectable separation means such as the weakened portion preferably in the form of knock-off notch 18 is formed in the threaded portion of the elongate threaded attachment rod 12 at a predetermined location along the length thereof spaced from the ends 14' and 16' thereof. The knock-off notch 18 is located so that when the elongate threaded attachment rod 12 is severed thereat, the threaded remnant portion 20 so defined will be long enough to position the fastener member 22 at a location where it will support the fixture at a level closely proximate the ceiling of the enclosure where it is to be installed.

In addition to the knock-off notch 18, an upset portion 24 is formed in the threaded portion of the elongate threaded attachment rod 12 at a location above the knock-off notch 18 but in the vicinity thereof. The upset portion 24 (which may be termed a deformed portion) involves the slight deformation or modification of the threads in the area thereof which is sufficient to enable the upset portion to function to jam or freeze the fastener member 22 against further movement along the length of the elongate threaded attachment rod (rather, along the length of the remnant end portion 20 defined upon severance of the elongate threaded attachment rod at the notch, as later described). The said jamming or freezing occurs when the fastener member 22 is forced upon said upset portion, as will be described hereinafter. Thus the upset portion 24 differs from the deformation formed in certain embodiments of the fixture installation assist means described in the copending application. This latter deformation is formed by crimping and functions to support the fixture in lieu of a fastener member.

The knock-off notch 18 is of a depth sufficient to faciliate manually effectable severance of the attachment rod 12 thereat yet to provide sufficient strength to said attachment rod to enable it to support the fixture temporarily upon a fastener member 22 threadably engaged therewith during the manual manipulations involved in the process of completing the electrical connection between the electrical power lead wires carried by and extending from the junction box with the electrical wires of the electrical device carried by the electrical fixture so as to complete the electrical connection therebetween. The elongate threaded attachment rod 12 is of sufficient length to provide enough space between the junction box and the fixture to enable those manipulations freely to occur.

When the electrical connection is completed, the fixture is raised along the length of the elongate threaded attachment rod 12 to a level above the notch 18 and the upset portion 24. The fastener member 22 also is raised to follow the fixture and is positioned so that it is on the threaded remnant end portion and located just immediately at or below the level of the fixture when the elongate threaded attachment rod 12 is severed at notch 18. The fastener member 22 functions to support the fixture when the attachment rod 12 is severed at the notch 18 and the threaded remnant end portion 20 is defined. When the elongate threaded attachment rod 12 is severed, the fixture will rest upon the fastener member 22. The location of the notch 18 is selected to define a a remnant end portion 20, when the elongate threaded attachment rod 12 of 12 is severed at the notch 18 after the fixture and fastener member 22 had been raised at a time subsequent to completion of the electrical connection so that the fastener member 22 can permanently support the fixture at the desired installed disposition thereof. The upset portion 24 on the remnant end portion then would be disposed proximate to the fixture and between the fixture and the fastener member.

Now, if the remnant end portion 20, after the installation is completed, should extend a distance to far outwardly of the fixture so that it would mar a finished appearance of the installation, the fastener member then can be rotated in the direction of the arrow 26 so that it engages the upset portion 24, and is frozen or jammed thereat. The fastener member 22 still can be rotated further but now such rotation will effect rotation of the entire remnant end portion 20, causing the one end thereof (which is engaged within the threaded attachment hole of the attachment tab) to be raised relative to the attachment tab, thereby to withdraw the remnant end portion 20 from its extended position outward of the fixture. Thus, the undesired undue extension of the remnant end portion 20 is withdrawn and the fastener member 22 now is located close to the outer surface of the fixture, permanently supporting same in installed condition without the marring of the finished appearance.

Figures 2, 3:
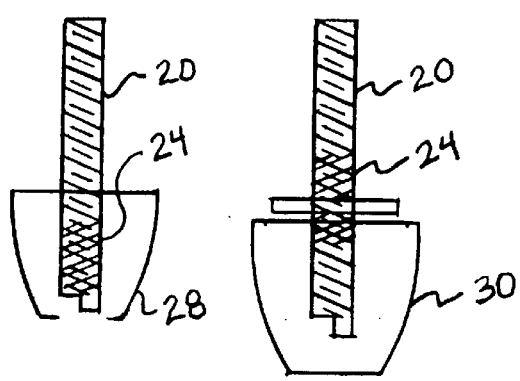
FIG. 2 is an elevational view of the remnant end of the threaded attachment rod according to the invention illustrated with only a perforate cap nut engaged with the upset portion of said remnant end.
FIG. 3 is an elevational view of the remnant end of the threaded attachment rod according to the herein invention illustrated engaged with first and second fastening members, the first fastening member being a thin flat nut engaged with the upset portion of said remnant end, and the second fastening member being a cap-nut engaged on the free end of said remnant end.

The fastener member 22 is selected to be a thin flat nut or may comprise a perforate cup-nut 28 as shown in FIG. 2 or an imperforate cup-nut 30 (or acorn nut) in combination with the thin flat nut 22 as shown in FIG. 3.

Certain electrical fixtures include an open topped canopy 32 of dish-like configuration which is to be installed with the rim 34 thereof flush or at least closely proximate to the ceiling of an enclosure. This type of fixture 36 is illustrated simply in FIG. 4. In these instances, one would expect that the installed remnant end portion 20 of the attachment rod 12 could extend outward from the surface of the canopy 32 (as shown) to the extent so as to be visible from the exterior of the installed canopy 32 sufficient to mar the clean finished appearance of the installation.

Figures 5, 6:
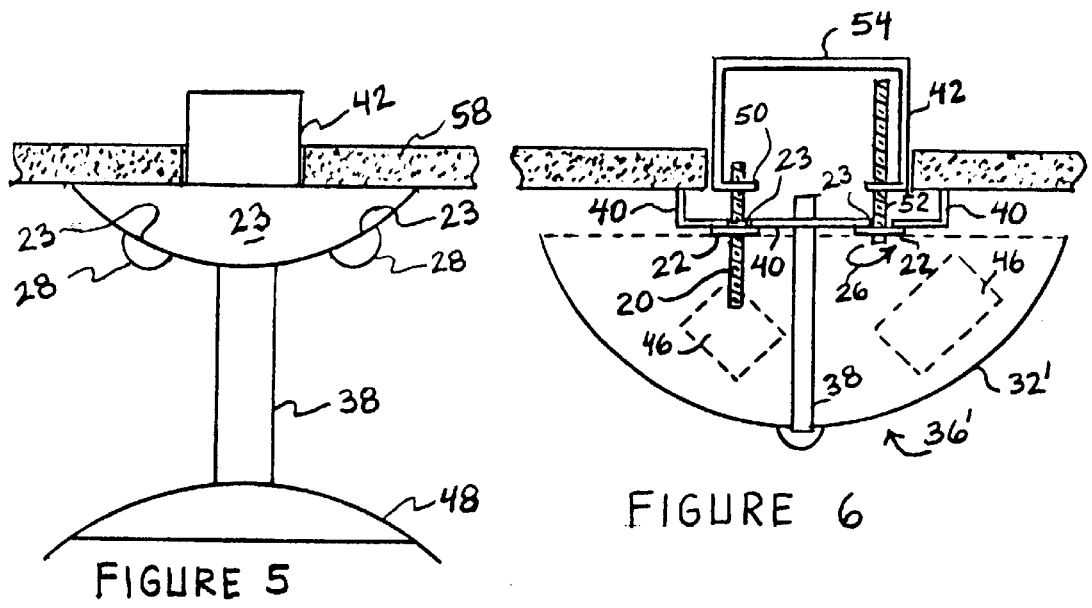
FIG. 5 is a diagrammatic elevational representation of the electrical fixture installation of FIG. 4 but illustrating the final finished appearance of the installation resulting from utilization of the electrical fixture installation assist means of the herein invention.
FIG. 6 is a diagrammatic elevational representation of a modified electrical fixture installation wherein the fixture includes a canopy mounted closely proximate to the ceiling (of an enclosure, not shown), the canopy being supported by a hollow hanger tube secured to a strap plate disposed across the open mouth of the canopy, the strap being secured to a structurally mounted junction box by means of the at least partially threaded attachment rod of the electrical fixture installation assist means of the herein invention and illustrating the excessive projection of one of the remnant portions of said means into the interior of the fixture so as to interfere with the function thereof, a second remnant portion being illustrated withdrawn from its projection into the interior of the fixture by utilizing the upset portion provided by the invention; the left hand remnant end being illustrated as unduly extending into the interior area of the fixture and the right hand remnant end illustrating the employment of the installation assist means according to the herein invention to withdraw the remnant end from its undue extension into the interior of the fixture, the portion of said right hand remnant end portion shown in phantom outline representing the portion shifted in position by rotation of the jammed fastener member, causing the remnant end to be positioned further into the junction box.

In FIG. 5, the remnant end portion 20 is illustrated withdrawn from its excessive outwardly extending condition by the engagement of the cup nut 28 with the upset threaded portion 24 and the additional rotation of said cup-nut 28. The free ends of the remnant end portions are hidden by the cup-nuts, providing an unmarred finished appearance to the installation.

Referring to FIG. 6, there is illustrated an example of a fixture installation where too much of the threaded remnant end portion 20 projects interior of the fixture 36' so as to interfere with the function of the fixture, i.e. of the electrical device carried thereby. In the installation of FIG. 6, the fixture 36' is supported by a hanger tube 38 coupled to a strap 40 disposed across the mouth of the canopy 32 and secured to the electrical junction box 42, here, by the attachment rods 12 engaged in the attachment holes 50 carried by the junction box 54. In some instances, the strap 40 may carry the threaded attachment holes 30, the strap being secured to the attachment tabs of the junction box. This type of fixture 36' can carry electric sockets 46 (shown in phantom outline) therein capable of receiving lamps (not shown). When the attachment rods, i.e. the remnant end portions 20 thereof, extend into the interior of the dish-like fixture 36' as shown, the lamps, for example, or even the sockets 46, cannot be accommodated within the interior area of the canopy without encountering interference by the said remnant end portions. Therefore, the depth of the extension of said remnant end portions 20 must be moderated by engaging the fastening member 22, here a cap-nut 28, with the upset portion 24, jamming same thereat. The cap-nut 28 then is rotated, causing the one threaded end of the remnant end portion (as shown, the right hand remnant end portion) to be rotated in the attachment hole 50, here, of the attachment tab 52 carried by the electrical junction box 54. Such rotation carries the remnant end portion 20 further into the junction box, withdrawing said remnant end portion 20 from its interferent position within the interior of the fixture.

Figure 4:
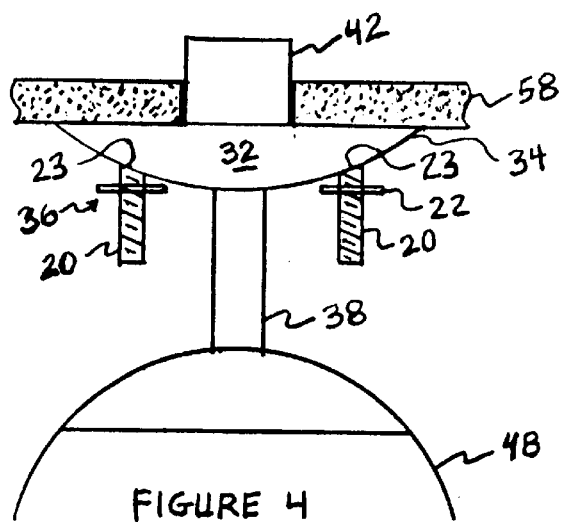
FIG. 4 is a diagrammatic elevational representation of an electrical fixture installation wherein the fixture includes a canopy having a depending tubular hanger member coupled to a reflector carrying an electrical lamp socket, the electrical fixture installation assist means such as shown in the copending application being illustrated as extending outwardly from the canopy upon completion of the installation to an extent obviously viewable by the viewer so as to mar the finished appearance of the installation.
Figure 7:
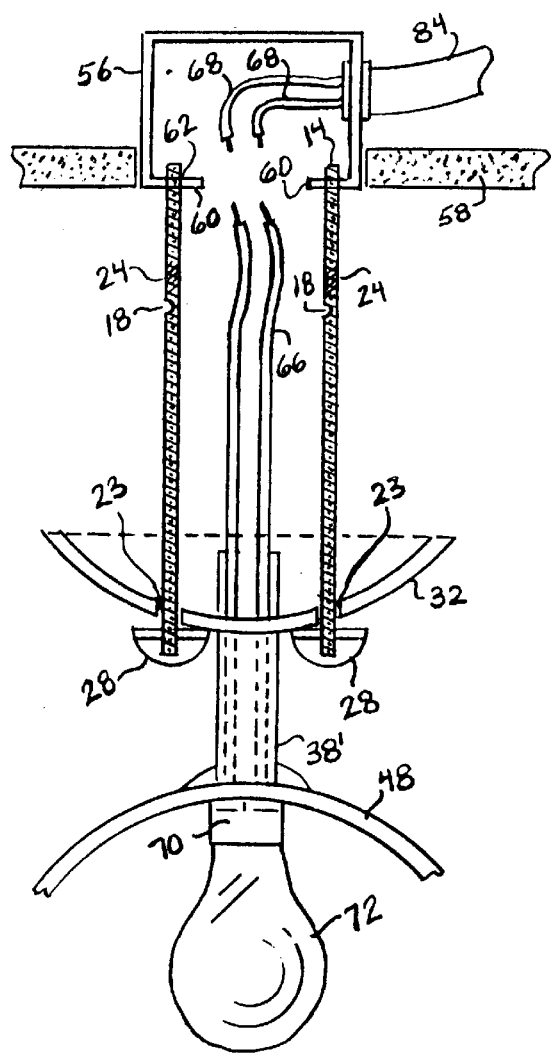
FIG. 7 is a more detailed elevational view of the installation such as illustrated in FIG. 4 but utilizing the installation assist means of the herein invention, and illustrating the first stage of the installation prior to completion of the electrical connection.

Referring to FIG. 7, there is illustrated the first stage in the installation of a fixture 36 similar to the fixture illustrated in FIG. 4. Fixture 36 includes a canopy 32, a hanger tube 38', a reflector dish 48 in which is mounted a lamp socket 50 carrying a lamp 52. The junction box 56 is pre-installed flush with the ceiling 58. The junction box 56 carries a pair of oppositely disposed generally coplanar attachment tabs 60 extending toward one another. Each attachment tab 60 carries a threaded attachment hole 62. An attachment rod 12 is passed through respective spaced openings 64 formed in the canopy 32 and the one threaded ends 14 are threadably engaged within the respective attachment holes 62. Each attachment rod 12 is provided with a weakened portion, here a knock-off notch 18, at a predetermined location between the opposite ends thereof. Each attachment rod 12 also is provided with upset portion 24 (which may be described as a deformed portion). The upset portion 24, as described earlier herein, may be the length of only two turns of the threaded rod 12 or may be longer, say even four to six turns of said threaded rod. The upset portion 24 is capable of receiving the fastener member 28, but its configuration of the threads thereat is such as to jam or freeze the fastener member 28 when it is forced thereupon. The jammed or frozen fastener member 28 cannot follow the threads further so that further attempts at rotation thereof will cause the remnant end portion 20 (which is the full remainder of attachment rod 12 after severance) to rotate relative to the threaded attachment hole 62 and rise into the electrical junction box 56.

However, it should be noted that the first stage of the installation of fixture 36 is the alignment of the spaced openings 23 carried by the canopy portion 32 with the attachment holes 62. As mentioned earlier, the elongate threaded attachment rods 12 are passed through the spaced mounting openings 23 and the elongate threaded attachment holes 62, the threaded ends 14 threadably engaged therein. The fastener member 28 is engaged with the free threaded ends 16 of the attachment rods 12 so that the canopy portion 32 is spaced a substantial distance from the electrical junction box 56. The electrical wires 66 from the electrical socket 46 are threaded through the hanger tube 38' and extend toward the electrical junction box 56. The electrical power lead wires 68 are led to the electrical junction box 56 through cable 84. While the canopy portion 32 is disposed spaced substantially from the electrical junction box 56, and supported by the fastener members 28, the installer has access between the electrical junction box 56 and the canopy 32 sufficient to make the electrical connection between the electrical wires 66 from the socket 46 and the electrical power lead wires 68 by tying them together, capping the junction thereof. This occurs while the canopy portion 32 and its associated hanger tube 38' and reflector dish 48 are supported by the fastener members 28, the fixture 36 thus hanging free from the installer's grasp.

When the electrical connection has been completed, the canopy portion 32 is raised along the elongate threaded attachment rods 12 to a location past the notch 18 and the upset portion 24 of each elongate threaded attachment rod 12. The fastener members 28 also are raised along the respective elongate threaded attachment rods 12 to a location below the respective upset portion 24 and between the canopy portion 32 and the notch 18. The attachment rod 12 then is severed at the notch 18, defining the remnant end portions 20 and leaving the canopy portion 32 supported by the fastener members 28. The resultant structure is illustrated in FIG. 8.

Figure 8:
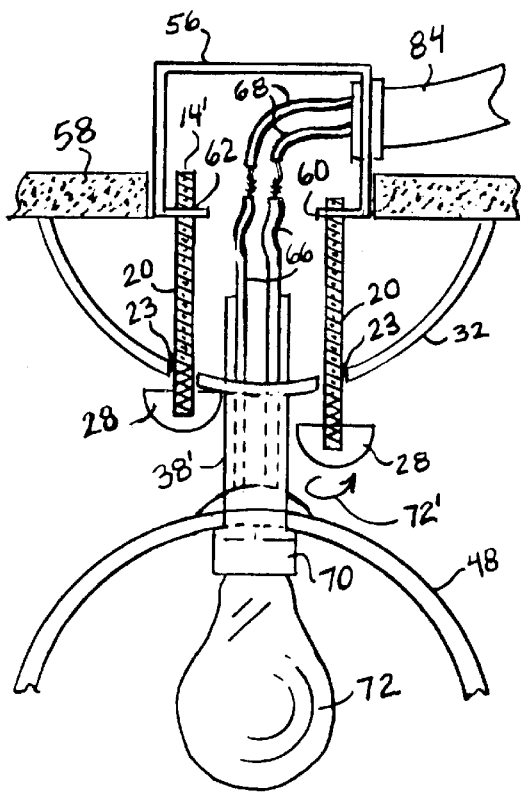
FIG. 8 is a more detailed elevational view of the substantially completed installation such as illustrated in FIGS. 4 and 5, showing the left hand remnant end in finished installed condition and the right hand remnant end in the process of being withdrawn from its extension outward of the canopy of the fixture.

The structure illustrated in FIG. 8 is shown with the left hand remnant end portion 20 permanently installed, with the fastener member 28 engaged with the canopy portion 32. The right hand remnant end portion 20 is shown extending an undesired distance from the canopy portion 32. The fastener 28 is engaged with the upset portion 24 and is in the process of being rotated (see arrow 72), the process of rotation effecting the rotation of the entire remnant end portion 20 to cause withdrawal of the remnant end portion 20 from its undesired extension outward from the dish-like portion 32' so as to assume a condition like that of the left hand remnant end portion 20, with the fastener member 28 engaged against the dish-like portion 32' and the upper end 14' of said remnant end portion 20 extending further into the electrical junction box 56.

Figure 9:
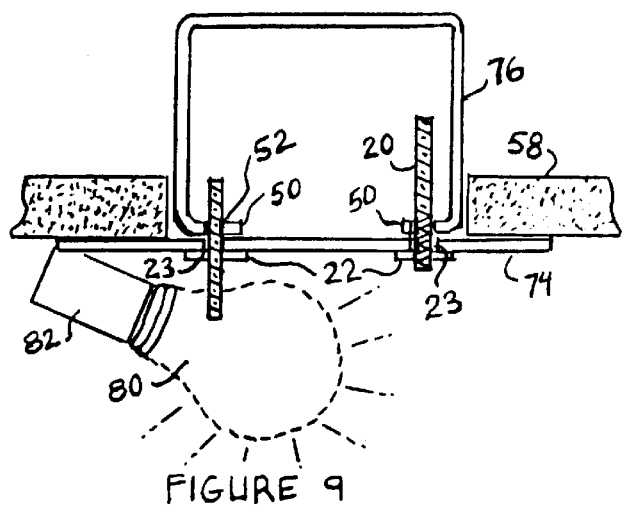
FIG. 9 is an elevational view of the installation of another fixture which includes a lamp receptacle and lamp to be mounted in the fixture illustrated in phantom outline to represent the interference with the lamp due to the intrusion of the left hand remnant end in the space to be occupied by the lamp, the right hand remnant end being illustrated in the process of being withdrawn from its extended position.

In FIG. 9 there is illustrated another type of electrical fixture 74, the installation of which is assisted by the use of the installation assist means of the invention, namely the improved elongate threaded attachment rod 12 thereof. The electrical power lead wires from the electrical junction box 76 and the electrical wires from the electrical socket 80 carried by the fixture 74 are not shown in the FIGURE. A lamp 82 which would be received in the electrical socket 80 is illustrated in phantom representation. The actual reception of said lamp 78 is prevented by the extension of the left hand remnant end portion 20 outward of the fixture 74. The said remnant end portion 20 is illustrated with the thin, flat washer-like nut 22 engaged with upset portion 24, said nut 22 being ready to be rotated to cause said left hand remnant end portion to be withdrawn from its interferent disposition to enable the lamp 82 to be introduced into the electrical socket 80. The right hand remnant portion 20 is illustrated with the nut 22 ready to be engaged with the upset portion 24 formed therein, so that the nut 22 is jammed (or frozen) thereon. The said nut 22 has been rotated further, carrying therewith the said remnant end portion 20 to withdraw said right hand remnant portion 20 from its undue extension below the fixture 74 so that said the remnant end portion is disposed substantially within the junction box 76 and the nut 22 engaged closely proximate the fixture 74 permanently supporting same.

The provision of the upset portion of the threaded portion of the elongate threaded attachment rod enables the installation assist means to be employed to assist in achieving a greater variety of electrical fixture installations than would be achieved using the electrical fixture installation assist means first disclosed in my pending patent application.

Minor variations from the described embodiments of the herein invention can be made by one skilled in this art without departing from the concept and scope of the invention as claimed hereinafter.

I claim:

1. Electrical fixture installation assist means for use in the installation of an electrical fixture to a structurally mounted electrical junction box including attachment tabs and respective threaded attachment holes formed in said attachment tabs, said electrical junction box having electrical power lead wires extending therefrom, said electrical fixture carrying an electrical device having a mounting surface carrying spaced mounting openings, said electrical device having electrical wires adapted to be coupled to said electrical power lead wires for effecting an electrical connection therebetween, said respective threaded attachment holes being alignable with at least one of said spaced mounting openings for receiving said electrical fixture installation assist means therethrough for engagement therein, said electrical installation assist means comprising:

at least one elongate threaded attachment rod having a predetermined length and a pair of threaded opposite ends, one of said threaded opposite ends thereof being engagable within one of said threaded attachment holes;

manually effectable separation means formed at a predetermined selected location along the length of said at least one elongate threaded attachment rod between said opposite threaded ends thereof enabling separation of a part of said at least one elongate threaded attachment rod at said predetermined selected location along the length of said at least one elongate threaded attachment rod between said opposite threaded ends thereof enabling separation of a part of said at least one elongate threaded attachment rod at said predetermined selected location, said predetermined selected location being chosen to be a predetermined distance from said one of said threaded opposite ends of said at least one elongate threaded attachment rod;

an upset portion formed on said at least one elongate threaded attachment rod at a location therealong between said one of said threaded opposite ends thereof and said manually effectable separation means proximate to said predetermined selected location;

a threaded remnant end portion of said at least one elongate threaded attachment rod formed as the reminder of said one of said threaded opposite ends after separation of said part of said at least one elongate threaded attachment rod at a time subsequent to completion of said electrical connection between said electrical wires of said electrical device carried by said electrical fixture and said electrical power lead wires of said electrical junction box, said threaded remnant portion being retained in engagement within said one of said threaded attachment holes;

a fastener member engaged with the other one of said threaded opposite ends of said at least one elongate threaded attachment rod supporting said electrical fixture temporarily prior to completion of said electrical connection and at a distance from said attachment tabs thereby providing access sufficient to enable manipulation of said electrical wires and said electrical power lead wires so as to effect completion of said electrical connection;

said at least one elongate threaded attachment rod being arranged to accommodate slidable movement of said electrical fixture along the length thereof past said manually effectable separation means to a location between said one of said threaded opposite ends of said at least one elongate threaded attachment rod and said upset portion at a time subsequent to completion of said electrical connection but prior to the operation of said manually effectable separation means so as to enable said threaded remnant end portion to be disposed at a time subsequent to the separation of said part of said at least one elongate threaded attachment rod through said one of said mounting openings carried by said mounting surface of said electrical fixture;

said fastener member capable of being moved following said electrical fixture past said manually effectable separation means and proximate to said upset portion at a time prior to the separation of said part of said at least one elongate threaded attachment rod; said fastener member being engagable with said threaded remnant end portion subsequent to said separation permanently to support said electrical fixture; and, said fastener member thereafter being capable of forcible engagement with said upset portion and jammed thereon thereby becoming immovable along said threaded remnant end portion yet being capable of being rotated further to effect simultaneous rotation of said threaded remnant end portion within said one of said threaded attachment holes causing said threaded remnant end portion to be withdrawn from excessive extension relative said electrical fixture occuring thereby permanently supporting said electrical fixture.

2. The electrical fixture installation assist means according to claim 1 in which said fastener member is a cup-nut.

3. The electrical fixture installation assist means according to claim 2 in which there is a second fastener member engagable with the threaded remnant end portion cooperating with said cup-nut to support the fixture in installed condition, said second fastener comprises a cup-nut engagable with said threaded remnant end portion for closing off same.

4. The electrical fixture installation assist means according to claim 1 in which said fastener member is a perforate cup-nut.

5. The electrical fixture installation assist means according to claim 1 in which said manually effectable separation means comprise a weakened portion formed at said predetermined selected location along said elongate threaded attachment rod.

6. The electrical fixture installation assist means according to claim 1 in which said manually effectable separation means comprise a knock-off notch formed at said predetermined selected location along said elongate threaded attachment rod.

7. The elongate threaded attachment rod according to claim 1 which is partially threaded.

8. An elongate threaded attachment rod for use in assisting the installation of an electrical fixture to a structurally mounted electrical junction box having attachment tabs carrying threaded attachment holes and having electrical power lead wires extending from said electrical junction box, said electrical fixture carrying an electrical device and having a mounting surface carrying spaced mounting openings, said electrical device having electrical wires adapted to be coupled to said electrical power lead wires for effecting an electrical connection therebetween, said spaced mounting openings being alignable with said threaded attachment holes for receiving said elongate threaded attachment rod therethrough for threadable engagement therewith, and said elongate threaded attachment rod having one threaded end engagable with one of said threaded attachment holes and having a threaded opposite end; manually effectable separation means formed between said one threaded end and said threaded opposite end of said elongate threaded attachment rod at a selected location along the length thereof for separating a part of said elongate threaded attachment rod at a predetermined distance from said one threaded end thereof; a threaded remnant end portion of said elongate threaded attachment rod formed as a remainder of said one threaded end after separation of said part of said elongate threaded attachment rod at a time subsequent to completion of said electrical connection between said electrical wires of said electrical device carried by said electrical fixture and said electrical power lead wires of said electrical junction box, said threaded remnant portion being retained in engagement within said one of said threaded attachment holes; an upset portion formed on said elongate threaded attachment rod at a location between said threaded end thereof and said manually effectable separation means proximate said manually effectable separation means; said elongate threaded attachment rod being constructed and arranged to accommodate slidable movement of said electrical fixture along the length thereof in a direction toward said attachment tabs of said electrical junction box and past both said manually effectable separation means and said upset portion at a time subsequent to completion of said electrical connection but prior to said separation of said part of said elongate threaded attachment rod; a fastener member engaged with said threaded opposite end of said elongate threaded attachment rod supporting said electrical fixture temporarily at a distance from said attachment tabs of said electrical junction box thereby to provide sufficient access to enable manipulation of said electrical wires and said electrical power lead wires effecting completion of said electrical connection, said fastener member being movable thereafter along the length of said elongate threaded attachment rod following said electrical fixture therealong at time subsequent to completion of said electrical connection but prior to separation of said part of said elongate threaded attachment rod, said fastener member being forcably engagable with said upset portion so as to be jammed thereon at one of said threaded attachment holes preventing further movement of said fastening member therealong past said upset portion and yet said fastening member being capable of further rotation whereby to effect simultaneous rotation of said threaded remnant end portion causing withdrawal of said threaded remnant portion from excessive extension thereof from said mounting surface of said electrical fixture.

9. The attachment rod according to claim 8 in which said manually effectable separation means comprise a knock-off notch formed in said elongate threaded attachment rod at said selected location.

10. The attachment rod according to claim 8 in which said fastener member is a quick-nut.

11. The attachment rod according to claim 8 in which said fastener member is a perforate cup-nut.

12. The elongate threaded attachment rod according to claim 9 which has a free end extending through said mounting opening and there is an additional fastening member threadably engaged with said threaded remnant end portion cooperating with said fastening member to close off said free end, said additional fastening member comprising a cup-nut.

13. The elongate threaded attachment rod according to claim 8 which is partially threaded.

14. In an elongate threaded attachment rod for use in assisting the installation of an electrical fixture to a structurally mounted electrical junction box, said electrical fixture having a mounting surface and a mounting opening formed in said mounting surface, said electrical fixture carrying an electrical device having electrical wires; said electrical junction box having electrical power lead wires emanating therefrom and including attachment tabs carrying threaded attachment holes, at least one of said threaded attachment holes being alignable with said mounting opening; said elongate threaded attachment rod having threaded opposite ends, one of said threaded opposite ends being engagable within said one of said threaded attachment holes, the other one of said threaded opposite ends being engageable through said mounting opening; said electrical wires adapted to be coupled to said electrical power lead wires for effecting electrical connection therebetween; manually effectable separation means formed in said elongate threaded attachment rod between said threaded opposite ends thereof at a selected location along the length thereof for separating a part of said elongate threaded attachment rod at a location a predetermined distance from said one of said threaded opposite ends; a threaded remnant end portion formed as a remainder of said one of said threaded opposite ends after separation thereof from said elongate threaded attachment rod at a time subsequent to completion of said electrical connection, said threaded remnant end portion being retained in engagement with said one of said threaded attachment holes; said elongate threaded attachment rod being constructed and arranged to accommodate slidable movement of said electrical fixture along the length thereof past said manually effectable separation means at a time subsequent to completion of said electrical connection but prior to separation of said part of said elongate threaded attachment rod, retaining means comprising a fastener member engaged with said other one of said threaded opposite ends of said elongate threaded attachment rod for supporting said electrical fixture temporarily at a distance spaced from said electrical junction box to provide access between said electrical junction box and said electrical fixture sufficient to enable manipulation of said electrical power lead wires and electrical wires so as to effect the completion of said electrical connection, said fastener member being movable along the length of said elongate attachment rod following movement of said electrical fixture at a time subsequent to completion of said electrical connection but prior to separation of said part of said elongate threaded attachment rod so as both to reach a position past said manually effectable separation means at a time subsequent to completion of said electrical connection but prior to separation of said part of said elongate threaded attachment rod whereby said fastener member is capable of supporting said electrical fixture after separation of said elongate attachment rod; the improvement comprising:

an upset portion formed in the threads along the length of said elongate threaded attachment rod at a location between said one of said threaded opposite ends thereof and said manually effectable separation means, said upset portion being included as a part of said threaded remnant end portion subsequent to said separation of said elongate threaded attachment rod with said fastener member engaged with said remnant end portion for movement therealong, said fastener member being engagable with said upset portion and jammed thereat, further rotation of said jammed fastener member simultaneously rotating said remnant end portion causing withdrawal of any excessive extension of said threaded remnant portion relative said mounting surface of said electrical fixture.

15. The elongate threaded attachment rod according to claim 14 which is partially threaded.

16. The elongate threaded attachment rod according to claim 14 in which said fastener member is a perforate cup nut.

17. The elongate threaded attachment rod according to claim 14 and a second fastening member engagable with the free end of said threaded remnant portion so as to close off the free end thereof.

18. The elongate threaded attachment rod according to claim 14 in which said threaded remnant portion has a free end adapted to extend outward of said electrical fixture and a second fastening member engagable with said free end of said threaded remnant portion so as to close off said free end.

\* \* \* \* \*